Dec. 4, 1945.　　W. T. BROWN ET AL　　2,390,419
PEANUT PLANT HARVESTER
Filed Dec. 1, 1943　　3 Sheets-Sheet 1
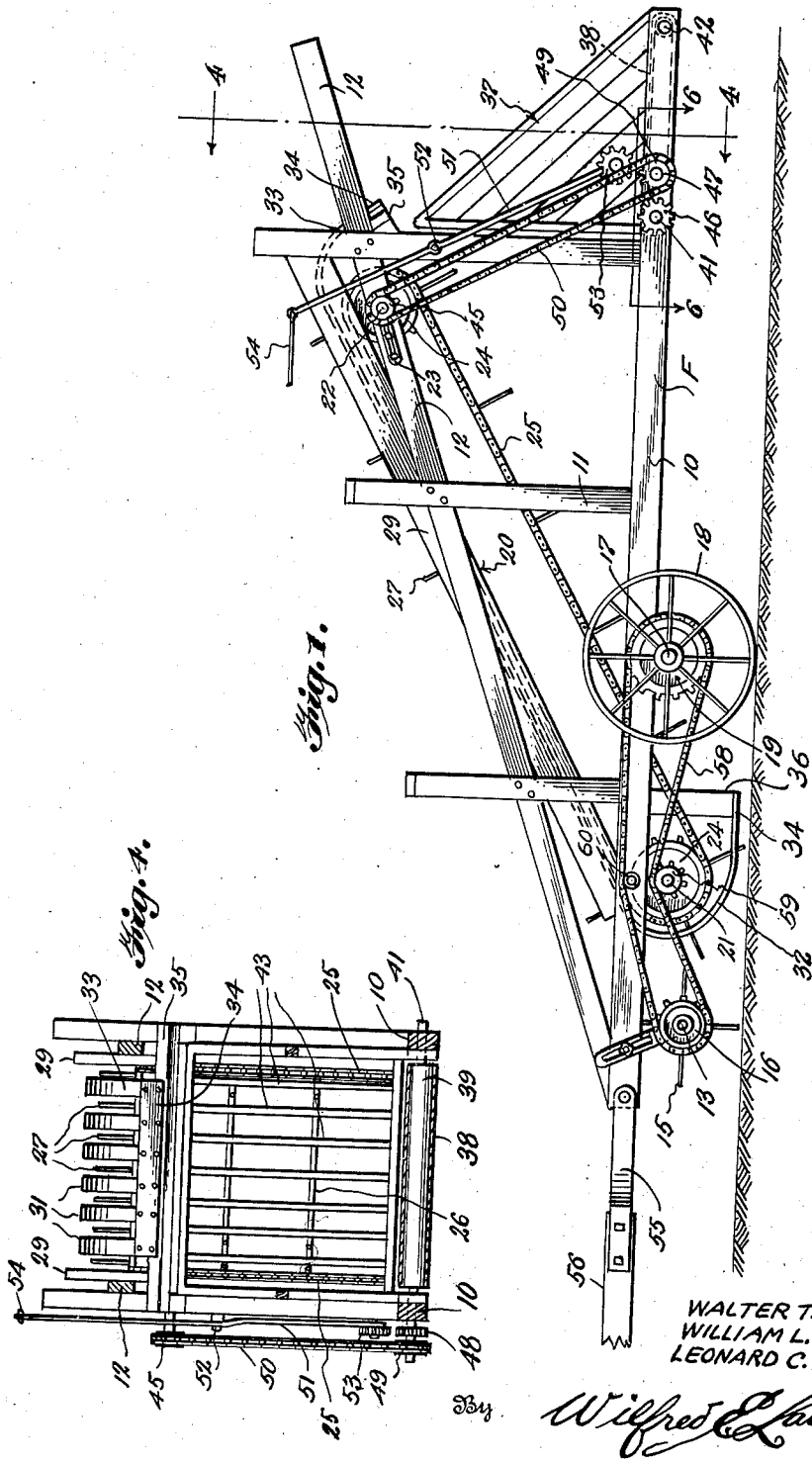
Inventors
WALTER T. BROWN
WILLIAM L. BROWN
LEONARD C. BROWN
By Wilfred E. Lawson
Attorney

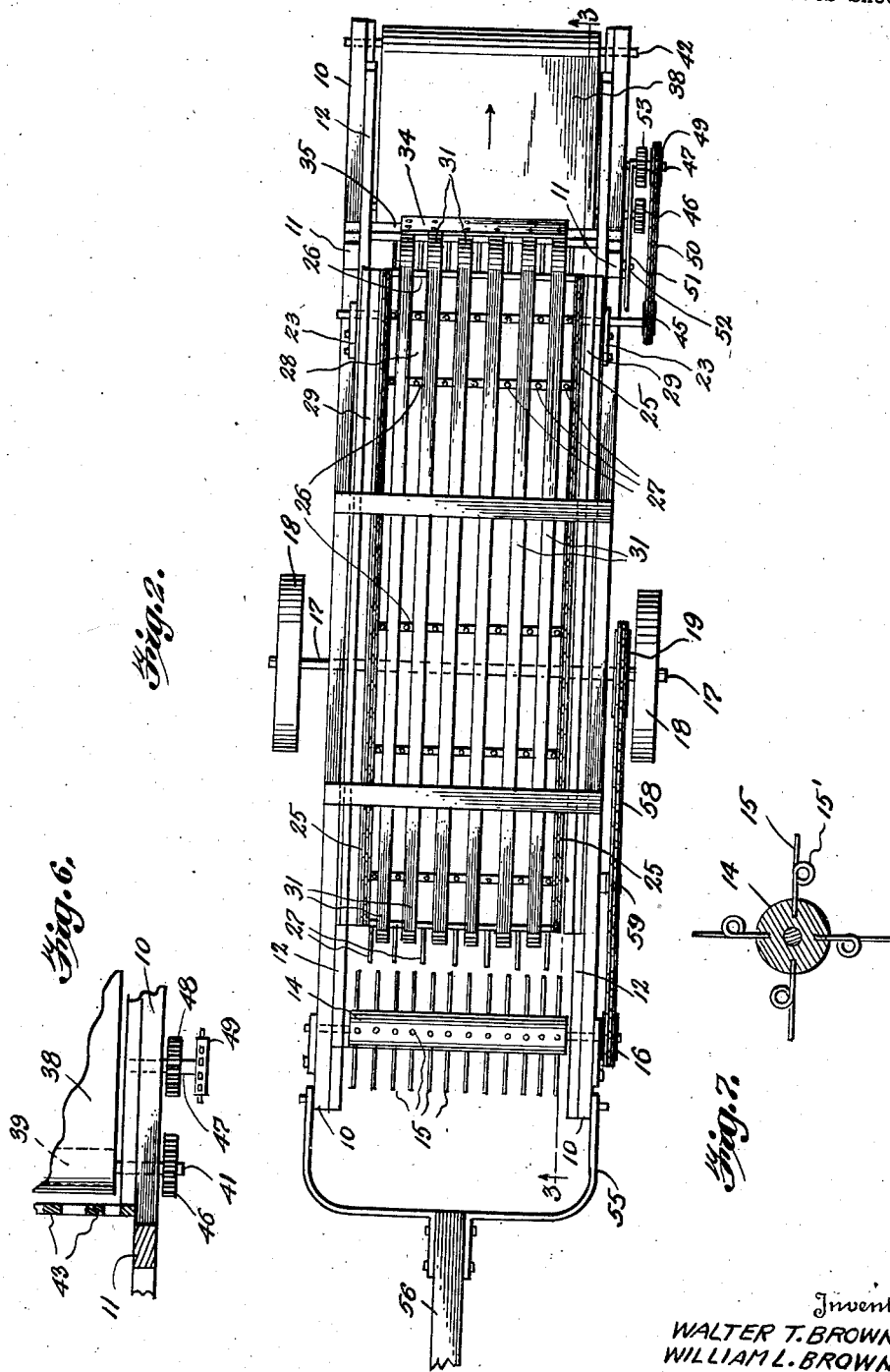

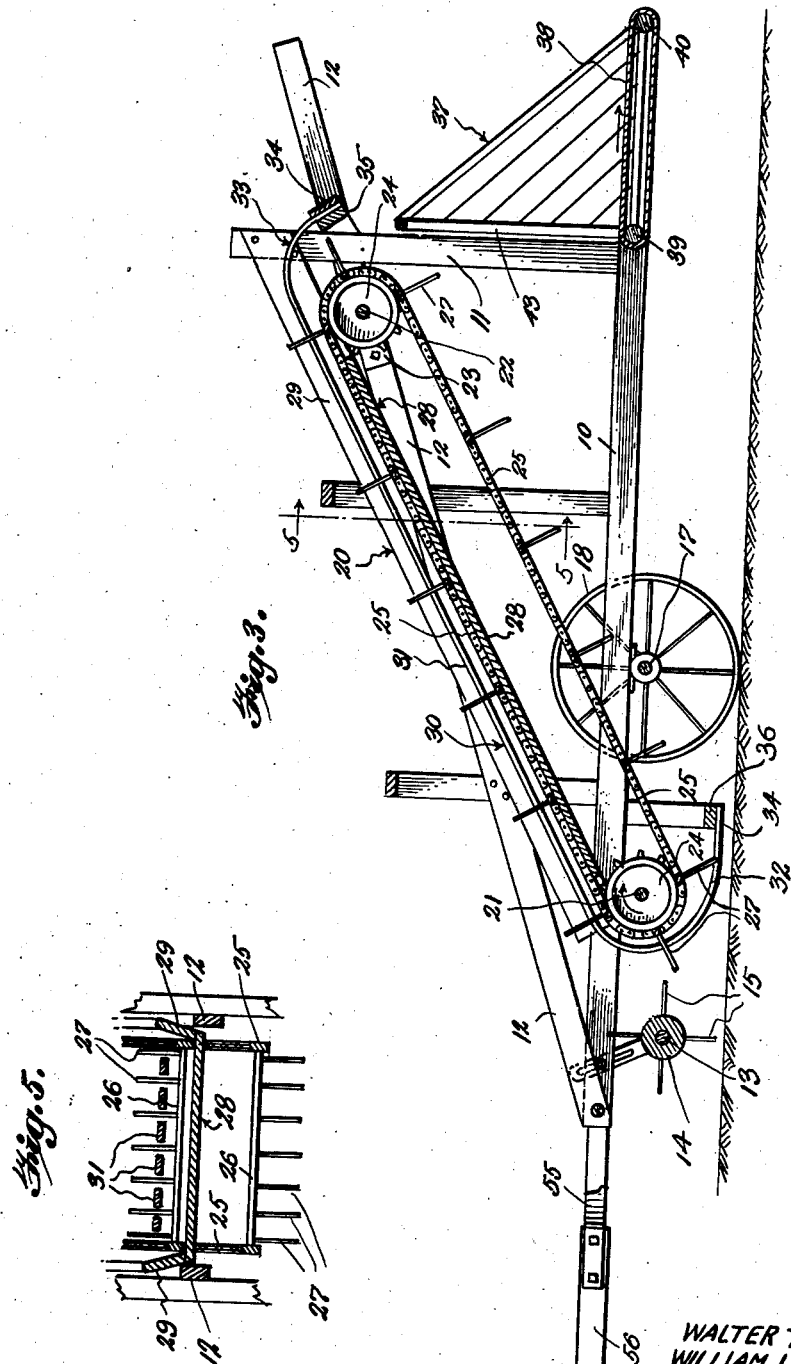

Patented Dec. 4, 1945

2,390,419

UNITED STATES PATENT OFFICE 2,390,419

PEANUT PLANT HARVESTER

Walter T. Brown, William Lee Brown, and Leonard C. Brown, Lumpkin, Ga., assignors of one-fourth to Johnston M. Deason, Lumpkin, Ga.

Application December 1, 1943, Serial No. 512,504

3 Claims. (Cl. 198—13)

This invention relates generally to agricultural machinery and pertains particularly to improvements in machines for harvesting or gathering peanut vines after the plant has been removed, by suitable means, from the ground.

A principal object of the present invention is to provide a wheel supported machine structure, designed to be drawn by any suitable draft means, for picking up from the surface of the ground peanut vines and conveying the same to a collection platform from which they may be discharged at intervals in piles for stacking in the customary manner about a supporting pole for drying.

At the present time the practice is to employ hand labor to gather up peanut vines from the ground and place them in the desired stacks around poles, after the plant has been removed from the ground by a suitable plow. Due to the present shortage of labor the harvesting of the crops of this plant is materially hampered and since the plant provides valuable oil and food material both for animal and human consumption it is particularly important at this time that means be provided whereby the harvesting of peanut crops may be accomplished despite the critical shortage of labor.

Another object of the invention is to provide in a machine of the character stated a balanced construction whereby the machine may be supported upon a single pair of wheels so that a single attendant can easily raise or lower the front end to facilitate attaching the machine to a draft vehicle or animal and also whereby the turning of the machine can be accomplished with ease.

Still another object of the invention is to provide in a harvesting machine of the character stated, a novel means associated with a conveyor whereby the plants will be easily and quickly freed from the conveyor teeth, for discharge onto a rear platform on which the plants are allowed to accumulate until a desired quantity has been obtained.

Still another object of the invention is to provide in a machine of the character stated, a collection platform in the form of a conveyor which is intermittently operated so that a stack of plants collected upon the platform can be discharged in a pile on the ground, after the stack has reached a desired size.

The invention will be best understood from a consideration of the following detailed description taken with the accompanying drawings forming a part of the application, it being understood, however, that the invention may be changed or modified if desired, so long such changes or modifications do not depart materially from the fundamental features of the invention as expressed in the appended claims.

In the drawings:

Figure 1 is a view in side elevation of the machine embodying the present invention.

Figure 2 is a view in top plan of the same.

Figure 3 is a vertical longitudinal section taken substantially on the line 3—3 of Figure 2.

Figure 4 is a vertical transverse section taken substantially on the line 4—4 of Figure 1.

Figure 5 is a sectional view taken substantially on the line 5—5 of Figure 3.

Figure 6 is a sectional view taken on the line 6—6 of Figure 1.

Figure 7 is a transverse section through a modified embodiment of the picker roller.

In accordance with the present invention, reference being had more particularly to the drawings, there is provided a frame structure which is generally designated F and which comprises the spaced lower side beams 10 which extend longitudinally of the machine, the upright side standards 11 and the longitudinal, forwardly and downwardly inclined elevator supporting side rails 12. These side rails are joined at their forward lower ends to the forward ends of side beams 10.

Extending across between and supported by the forward connected ends of the beams and side rails, is a picker roller shaft 13 upon which is mounted, between the joined side members of the frame, the picker roller 14 which has its peripheral surface studded with a plurality of relatively long pins or picker fingers 15. These fingers extend radially from the roller and are designed to sweep across the surface of the ground as the roller is turned, to pick up peanut vines therefrom as hereinafter stated.

At one end the shaft 13 carries a sprocket gear 16.

The side beams of the frame 10 are mounted in suitable manner, upon a supporting axle 17, upon the ends of which are mounted the ground engaging wheels 18. This axle, upon the side of the machine on which the sprocket gear 16 is located, has secured thereto a sprocket gear 19 from which power is derived for operating the hereinafter described elevator and platform conveyor.

The frame is mounted at its center of gravity upon the axle 17 so that the entire structure will be accurately balanced to facilitate lifting the forward end for attachment to a draft vehicle or animal and also to make easy the drawing of the machine over the ground and to avoid as much as possible unnecessary strains upon the draft hitch.

Supported by the frame structure between the side rails 12 is the elevator which is generally designated 20. This comprises a lower chain shaft 21 which is rotatably supported between the side beams 10 rearwardly of the picker roller, and an upper chain shaft 22 which is supported adjacent the upper ends of and by the side rails 12, in the longitudinally adjustable bearing bars 23. As shown in Figure 1 these bearing bars 23 are secured to the outer sides of the side rails 12 for adjustment longitudinally thereon so that the upper chain shaft 22 can be moved relative to the lower chain shaft for the purpose of properly tensioning the endless conveyor supported therebetween.

The upper and lower shafts 21 and 22 each supports a pair of sprocket wheels 24 and these wheels having passing therearound the endless chains 25 forming a part of the conveyor making up the elevator structure and these chains are connected by the transverse bars 26, each of which carries a plurality of spikes or fingers 27.

Supported beneath the upper run of the endless conveyor, by the adjacent standards and side rails of the frame, is the elevator floor 28 which supports the top run of the conveyor and prevents sagging of the same and extending lengthwise of each side of this floor is a side wall 29 which retains the vines or other materials, upon the elevator.

The numeral 30 generally designates the elevator floor guard which facilitates the proper picking up of the vines from the pickup drum, by the fingers of the elevator conveyor and the removal of the vines at the upper or discharge end of the elevator. This guard comprises a plurality of bars or rods 31 which may be in the form of flat strips of material laid in spaced side by side relation or round bars as desired and such bars or flat strips are turned or reverted at their lower and upper ends as indicated at 32 and 33 respectively and are joined together at such ends by the plates 34.

As shown the guard extends lengthwise over the elevator floor and the curved upper end thereof which is eccentric to the upper shaft 22 is secured to a suitable transverse support 35, forming a part of the frame while the lower plate 34 is secured to a corresponding support 36 so that the curved lower end of the guard partly encircles the lower shaft 21 and the sprocket wheels carried thereon.

By arranging the curved ends of the guard eccentric to the adjacent shafts with the top part, made up of the straight portions of the rods, lying relatively close to the elevator floor so as to permit the chains and cross bars to pass between the guard and the floor, it will be seen that as the endless conveyor moves around the front sprocket wheels 24 and upwardly over the floor, the fingers 27 will move in between the bars of the guard and upwardly along the floor between such bars. Upon reaching the upper end of the elevator the fingers will swing down and be retracted from between the curved upper ends of the guard bars and consequently they will be withdrawn from the vines which they had engaged and moved upwardly, so that such vines will be discharged over the rounded upper end of the guard onto a suitable underlying receiver.

In order that the vines may be properly piled and deposited at desired intervals upon the ground there is provided at the rear end of the machine a hopper generally designated 37. This hopper comprises rearward extensions of the side beams 10 between which is supported a movable floor in the form of an endless conveyor belt or fabric 38 which is supported upon forward and rear rollers 39 and 40 which in turn are carried by shafts 41 and 42 rotatably mounted between the extended side beams 10.

The front wall of the hopper comprises a plurality of slats 43 which are suitably supported between the adjacent rearmost standards 11 of the frame. The shaft 41 of the platform conveyor carries a gear 46 and adjacent to this gear there is mounted an idler gear shaft 47 upon which is mounted an idler gear 48 and a sprocket gear 49. The sprocket gear is connected with the overlying sprocket gear 45 by the sprocket chain 50.

The gears 46 and 48 are in relatively close relation but are unconnected.

Driving connection is established between the gears 46 and 48 to effect the operation of the platform conveyor from the elevator shaft 22, by the provision of an oscillating lever 51 which is pivotally mounted as at 52 upon a suitable adjacent part of the frame. Upon the lower end of this lever is carried a gear 53 and the lever is so arranged that when it is oscillated in one direction the gear 53 will be brought into coupling relation between the gears 46 and 48 so as to transmit the desired motion from the driven idler gear to the gear 46 which is connected with the forward shaft of the platform conveyor.

The upper end of the gear shifting lever 51 has connected therewith a cable 54 which is extended to the draft machine, not shown, so that the operator of the draft machine and of harvesting machine can operate the platform conveyor as desired to dump or discharge therefrom the peanut vines, after a suitable stack has been formed thereon.

Any suitable means may be employed for coupling the present machine with a draft animal or vehicle. For the connection of the machine with a draft vehicle such as a tractor or the like there may be provided the draft hitch illustrated which comprises a fork 55 having its two ends connected between the forward ends of the side beams and joined at its forward end to the short coupling bar 56, the forward end of which is suitably apertured to receive the connecting pin of the standard coupling, not shown, forming a part of any standard tractor.

While the picker fingers carried by the picker roller at the forward end of the machine, may be made in the form of rigid pins, they may also be, and preferably are, formed of relatively light weight spring metal having therein a spring loop 15' so that as the picker roller revolves and the points of the fingers are brought into close proximity to or into direct connection with the ground they will not be permanently bent but will merely yield to the proper extent to permit the roller to turn and pick up the vine.

While any suitable means may be employed for rotating the picker roller it is preferred that such rotation be accomplished through the medium of a driving sprocket chain 58 connected between the sprocket gear 19 which is carried upon the machine axle, and the sprocket gear 16 mounted upon the shaft 13 which carries the picker roller. As shown this chain is also employed for driving the elevator conveyor by passing the bottom run of the chain 58 over the sprocket gear 59 carried upon the forward shaft 21 of the elevator, as shown.

The upper run of the driving chain 58 is carried over a suitable support 60 mounted upon the side of the frame above the sprocket gear 59.

From the foregoing it will be apparent that in the operation of the present harvesting machine the picker roller 14 is rotated by the driving chain 58 in the same direction as the wheels 18 so that the picker fingers are carried forwardly and downwardly under the roller to sweep the vines rearwardly and upwardly onto the forward end of the elevator. Here they will be immediately picked up by the fingers 27 and carried upwardly to the discharge end of the elevator where the fingers will be caused to withdraw from the vines by the guides between which the fingers move, causing the vines to slide off the rearwardly downwardly curving ends 33 of the guard bars and onto the platform conveyor. The conveyor will at such time be stationary but after a sufficient quantity of vines has collected upon the conveyor the operator may cause the vines to be dumped by oscillating the lever 51 to establish the desired driving connection between the gears 46 and 48 so as to run the conveyor back and dump the vines in a pile on the ground.

We claim:

1. In a harvesting machine of the character described, the combination comprising a wheel supported frame, an elevator supported on the frame and extending at an inclination upwardly and rearwardly, said elevator including an endless conveyor, means for transmitting driving power to the conveyor, a horizontally disposed platform conveyor supported by the frame rearwardly of the upper end of the first conveyor and at an elevation beneath the same to receive material therefrom, said platform conveyor including a shaft and a gear on the shaft, an idler gear supported for rotation adjacent to the first mentioned gear, means for transmitting driving power from the first conveyor to the idler gear, and means operable from a point remote from said gears for establishing an operative coupling between the gears.

2. A machine of the character stated in claim 1, in which the last stated means comprises a pivotally supported lever and a gear supported for free rotation on the lever and adapted to be moved upon oscillation of the lever in one direction, into toothed connection with the first mentioned gears.

3. The combination in a machine of the character stated, of a wheel supported frame, an elevator carried by the frame and extending at an upward and rearward inclination thereon, the elevator including an endless conveyor and a rotatable shaft, means for transmitting power to said conveyor, a horizontally disposed platform conveyor supported upon the frame at an elevation below the upper end of the first conveyor and rearwardly thereof, said platform conveyor including a shaft and a gear on the shaft, a second gear supported for free rotation adjacent to the first gear and free of connection with the first gear, means for transmitting rotary motion from said shaft to said second gear, a lever supported at a point above said gears for oscillation on an axis paralleling the rotary axes of the gears, means connected with the lever for effecting its oscillation from a remote point, and a gear supported upon the lower end of the lever for free rotation and at an elevation above the first gears, to be swung into operative connection with the first and second gears upon oscillation of the lever in one direction to form an operative coupling between the first two gears.

WALTER T. BROWN.
WILLIAM LEE BROWN.
LEONARD C. BROWN.